United States Patent [19]
Balling

[11] Patent Number: 5,649,236
[45] Date of Patent: Jul. 15, 1997

[54] RECYCLABLE CAMERA

[75] Inventor: Edward Norman Balling, Rochester, N.Y.

[73] Assignee: Eastman Kodak Company, Rochester, N.Y.

[21] Appl. No.: 620,429

[22] Filed: Mar. 22, 1996

Related U.S. Application Data

[60] Provisional application No. 60/001256, Jul. 20, 1995.
[51] Int. Cl.⁶ .................................................... G03B 17/02
[52] U.S. Cl. ................................................ 396/6; 396/538
[58] Field of Search ..................................... 354/288, 275; 396/6, 511, 512, 535, 538, 541

[56] References Cited

U.S. PATENT DOCUMENTS

| | | | |
|---|---|---|---|
| 2,323,009 | 6/1943 | Claudot et al. | 354/288 |
| 2,378,406 | 6/1945 | Harris . | |
| 3,906,535 | 9/1975 | Takahama et al. | 354/288 |
| 4,855,774 | 8/1989 | Ohmura et al. | 354/203 |
| 4,896,178 | 1/1990 | Ohmura et al. | 354/145.1 |
| 4,954,858 | 9/1990 | Ohmura et al. | 354/145.1 |
| 5,381,200 | 1/1995 | Takagai | 354/288 |

*Primary Examiner*—A. A. Mathews
*Attorney, Agent, or Firm*—Peter J. Bilinski; Robert Luke Walker

[57] ABSTRACT

A recyclable camera having front and rear covers which when assembled together define chambers for containing a film cartridge and a film roll, respectively. According to the invention, a photographic module assembly including the photographic components of the camera is sandwiched between the front and rear covers and is preferably attached to the rear cover to form a completed camera unit. The photographic module assembly also includes the exposure chamber for an advanced filmstrip, but does not include the film roll retaining chamber or the film cartridge chamber which are instead formed within the front and rear cover portions of the camera.

20 Claims, 9 Drawing Sheets

RECYCLABLE CAMERA

CROSS-REFERENCE TO RELATED APPLICATIONS

Reference is made to and priority claimed from U.S. Provisional application Ser. No. 60/001,256, filed 20 Jul. 1995, entitled RECYCLABLE CAMERA.

Reference is made to commonly assigned copending application Ser. No. 08/620,617, entitled: RECYCLABLE CAMERA, co-filed herewith in the name of Edward N. Balling.

FIELD OF THE INVENTION

The invention relates generally to the field of photography, and in particular to an improved recyclable camera. More specifically, a camera is described having front and rear covers which when assembled together define separately sized chambers for retaining a film cartridge and a film roll, respectively. A reusable photographic module assembly containing the major photographic components and defining an exposure chamber is sandwiched between the front and rear covers.

BACKGROUND OF THE INVENTION

Recyclable cameras, such as the so-called "single use" or "one-time use" type cameras are becoming increasingly popular in the field of photography. In such cameras, a wound roll of an unexposed photographic filmstrip is contained in a chamber of a lighttight camera body and is sequentially advanced in a frame by frame manner across an exposure chamber into a film cartridge, which is separately contained in another chamber of the camera body. After all of the exposures have been taken by the camera user, the film cartridge is removed from the film cartridge chamber of the camera body by a photofinisher for processing.

The camera body includes a frame which is sandwiched between a front cover portion and a rear cover portion. A majority of the photographic components are attached to the exterior of the frame which also includes molded-in features for defining the exposure chamber as well as the film cartridge and film roll chambers, respectively. Inherently, however, impact damage is often caused when the lighttight camera body is opened by a photofinisher in retrieving the film cartridge which often destroys the film cartridge chamber, thereby destroying the lighttight integrity of the camera and causing the entire replacement of the camera frame. Particularly for recyclable cameras, the replacement of the camera frame is not at all desirable due to the increase in the costs associated, mainly because the majority of the camera's photographic components, such as the viewfinder and the film advance mechanism, can be reused a number of camera lifetimes. Therefore, a need exists to provide a camera which can be more efficiently recycled to provide optimum reuse of components.

SUMMARY OF THE INVENTION

The present invention is directed to overcoming one or more of the problems set forth above. Briefly summarized, according to one aspect of the present invention, there is provided a camera comprising a front cover section, a rear cover section attached to the front cover section, a photographic module assembly sandwiched between the front and rear cover sections, and means for defining a film cartridge chamber, a film roll chamber and an exposure chamber between the film cartridge chamber and the film roll chamber, is characterized in that:

the photographic module assembly has means for defining only one of said chambers, and said front and rear cover portions include means for defining the remaining chambers.

In a preferable arrangement, the photographic module assembly contains the major photographic components, including the film advance mechanism, the optical lens and shutter assemblies and the viewfinder in addition to defining only the exposure chamber which can be conveniently located between the cover portions of a recyclable camera.

An advantageous aspect of the present invention is that a camera is provided which can be recycled with fewer replacement parts and therefore can be recycled at a minimum cost.

Another advantageous aspect of the present invention is that impact damage to a camera made in accordance with the present invention is more likely to affect the non-reusable portions of the camera body while those portions of the camera capable of reuse are more likely to be unaffected.

Another advantageous aspect of the present invention is that the described camera encourages the joint removal of the cartridge and the battery is encouraged because the battery is adjacently stored and can be easily ejected when the cartridge is being removed from the camera through a single opening.

Still another advantageous aspect of the present invention is that a mechanical sub-assembly is described which can be accurately positioned within the camera and can by its positioning control specific distance parameters such as lens to film plane distance which directly affect the quality of the image which is taken by the camera.

These and other aspects, objects, features and advantages of the present invention will be more clearly understood and appreciated from a review of the following Detailed Description of the Preferred Embodiments and appended Claims, and by reference to the accompanying drawings.

DETAILED DESCRIPTION OF THE INVENTION

The following description refers to a single preferred embodiment according to the present invention. It should be readily apparent that other useful embodiments employing the concepts taught by this invention are easily imagined and therefore the following description should not be specifically limited to the preferred embodiment.

Figure 1:
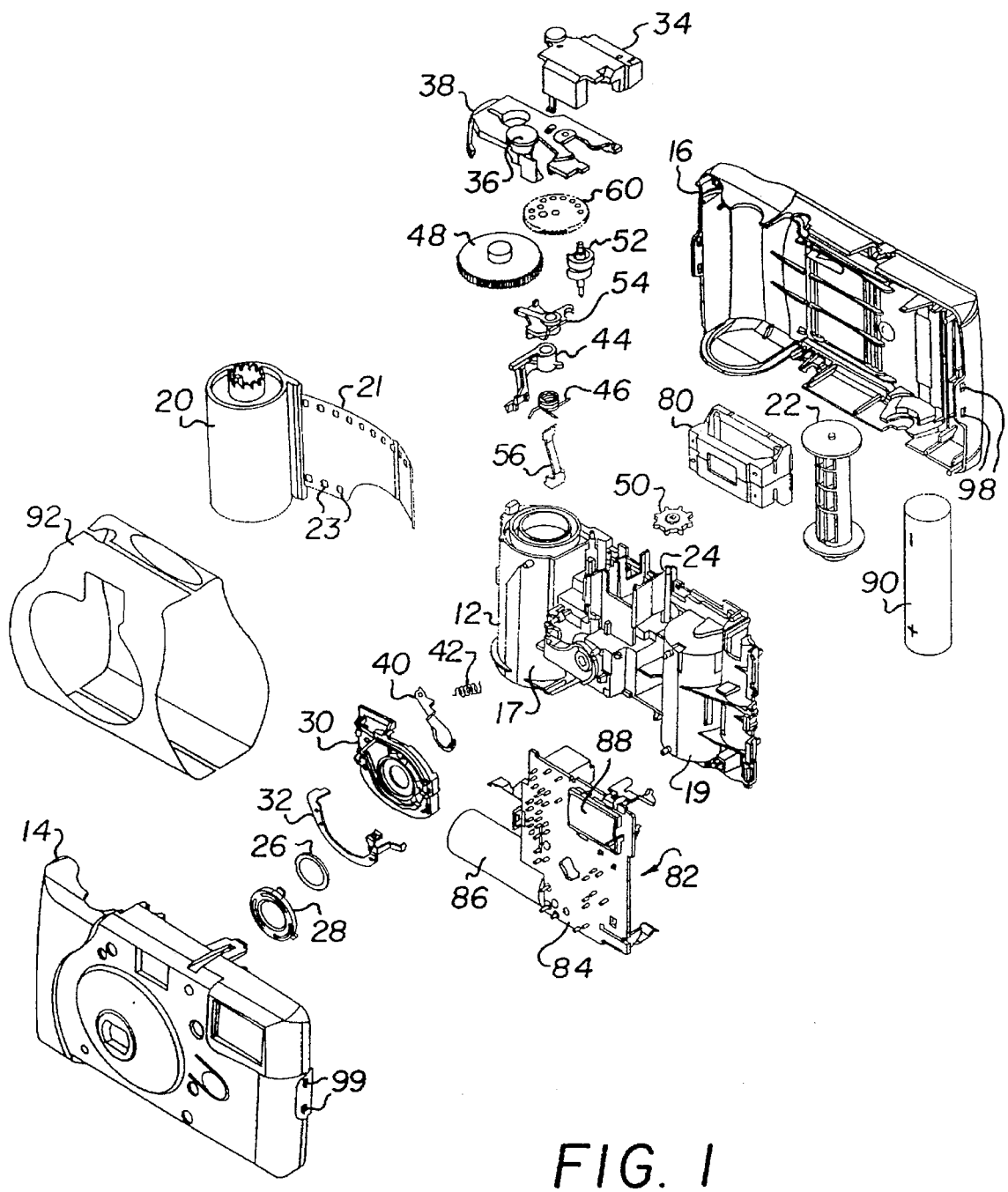
FIG. 1 is an exploded front perspective view of a recyclable camera found in the prior art.
Figure 2:
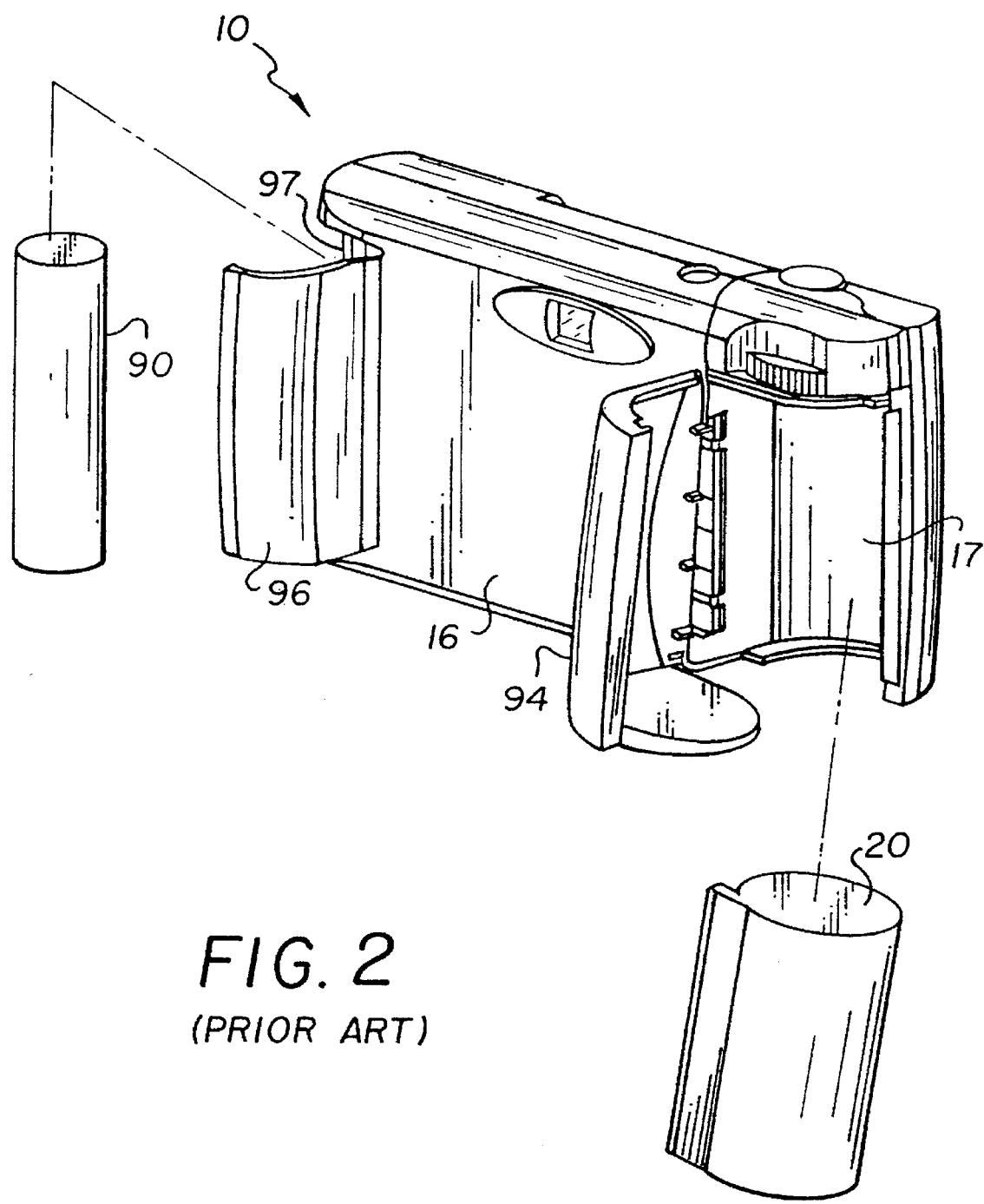
FIG. 2 is a rear perspective view of the assembled camera of FIG. 1.

In order to more clearly articulate the problems solved by the present invention, however, it is useful to refer to a recyclable camera according to the prior art. Referring to FIGS. 1 and 2, a typical prior art single-use camera 10 is shown comprising a main body 12, a front cover 14 which is attached to the front of the main body, and a rear cover 16 that is attached to the rear of the main body. Each of the main body 12, the front cover 14 and the rear cover 16 are preferably molded plastic parts.

The main body 12 includes a pair of formed semi-cylindrical chambers 17, 18 for retaining a film cartridge 20 and a take-up spool 22, respectively. The chambers 17, 18 are oppositely disposed relative to an exposure chamber 24 and each contain an open rear side. The main body 12 additionally supports a number of camera components which are attached thereto prior to the attachment of the covers 14, 16 which sandwich the body. In brief, these components include a taking lens 26 which is attached to the front of the main body 12 35 by means of a retainer 28 and a support plate 30, sandwiching the lens element therebetween. A contact switch 32 is also attached to one side of the support plate 30. Other components attached to the body include a plastic viewfinder 34; a shutter mechanism consisting of a keeper plate 38 having a depressible shutter release button 36 for tripping a shutter blade 40, which is biased by a spring 42 via a high-energy lever 44 which is also biased by a helical spring 46; a film advancing and metering mechanism consisting of a film winding knob 48 which engages the spool of a loaded film cartridge 20, a sprocket 50 for engaging edge perforations of a filmstrip 21 having a spring biased portion extending into a rotatable cam 52 which engages a metering lever 54 biased by a spring 56, the cam having an extending portion 58 for contacting the teeth of a frame counter 60; a light baffle 80 which is mounted to the rear of the body in the exposure chamber 24; and an electronic flash assembly 82 including a circuit board 84, capacitor 86, and flashhead 88, which is powered by a battery 90 which according to this particular embodiment is vertically retained in a battery compartment 97, best seen in FIG. 2 and directly adjacent the film roll chamber 18.

The rear cover 16 is preferably attached to the front cover 14 by engagement snaps 98 which engage corresponding holes 99 in the front cover 14. Alternately, or in addition to the engagement snaps 98, the covers 14, 16 can be spot welded ultrasonically, or other securing means may be employed. The main body 12 is supported between the two covers 14, 16.

Referring specifically to FIG. 2, the rear cover 16 also includes a first break-away door 94 adjacent the open rear side of the film cartridge chamber 17 to allow the removal of the film cartridge 20 by the photofinisher after all of the exposures have been taken by a user. In this particular prior art camera, the rear cover 16 also includes a second break-away door 96, similarly located adjacent the battery compartment 97 and oppositely disposed relative to the first break-away door 94 adjacent the film roll chamber 18, FIG. 1. In the embodiment shown, each of the first and second break-away doors 94, 96 include a weakened area which can be folded open to reveal the open rear side of the cartridge chamber 17 and the battery compartment 97 to allow separate removal of the film cartridge 20 and the flash battery 90, respectively, after the engagement snaps 98 have been disengaged from the corresponding holes 99. In order to prevent consumers from prematurely opening the engagement snaps and the camera 10, the snaps 97 are typically designed to be opened by using a special tool which is provided to the photofinisher (not shown). Details relating to the assembly of the covers 14, 16 and the first and second breakable doors 94, 96 are described in co-pending and commonly assigned U.S. Ser. No. 08/327,250 filed Oct. 21, 1994 and entitled: COVER ASSEMBLY FOR CAMERA.

While the described break-away doors 94, 96 provide relatively easy access to the film cartridge 20 and the battery 90 respectively, it has been shown, however, that photofinishers often utilize other means to expedite the opening of a camera such as the one presently described. Rather than using a special tool (not shown) to disengage the engagement snaps 98 or spot welds (if spot welds rather than engagement snaps are employed), one such method is to impact the edge of the camera body containing the film cartridge 20 against the edge of a table to effectively crack the camera 10 open. This form of opening, though effective in allowing removal of the film cartridge 20, usually also cracks the plastic film cartridge chamber 17. As previously noted, it is a primary goal to recycle the cameras. The cracking of the main body 12, however, requires replacement of the main body 12 and either the removal of the attached photographic components for possible retrofitting on a replaced main body 12, or scrapping the photographic components along with the main body. This definitely curtails any legitimate recycling effort.

An additional consideration occurs because the film cartridge 20 and the flash battery 90 are oppositely situated in cameras of the described type. The photofinisher is primarily interested in removing the film cartridge for film processing, and therefore may not bother to separately open the second break-away door to remove the flash battery 90 from the camera 10, even though it is preferred that the battery be removed by the photofinisher at the time of processing.

The Present Invention

The particular embodiment according to the present invention will now be described by referring to the accompanying drawings in general. For clarity, similar reference numerals will be used to refer to those components previously referred to above in the camera described in FIGS. 1 and 2.

Figure 3:
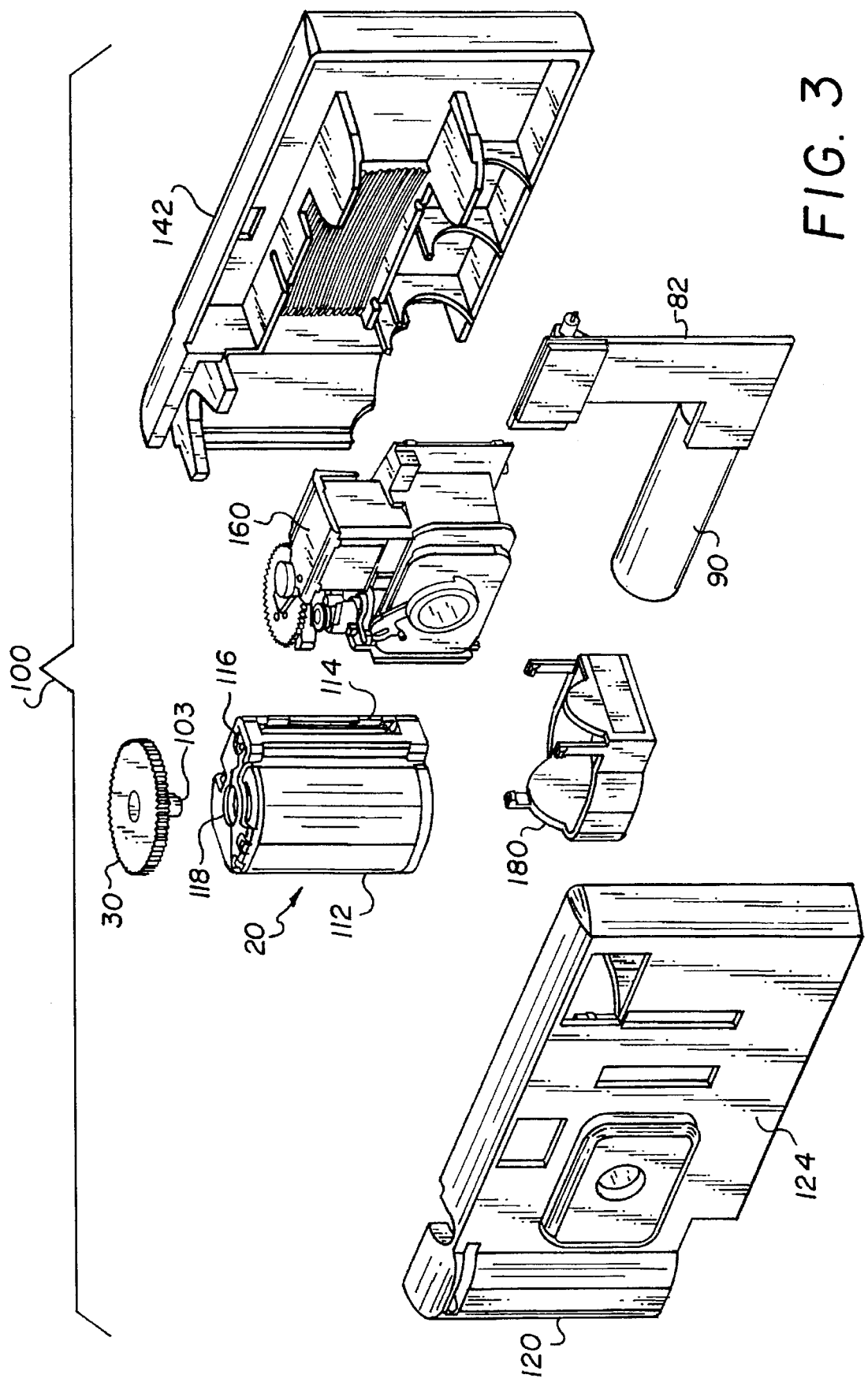
FIG. 3 is an exploded perspective view of a camera according to a preferred embodiment of the present invention.

Referring to the exploded assembly view of FIG. 3, there is shown a "single use" or "one-time use" camera 100 in accordance with a preferred embodiment of the present invention. The camera 100 includes a front cover portion 120 and a rear cover portion 142 which are joined together to form a camera body 102, FIG. 12. A photographic module assembly 160 is situated or sandwiched between the front and rear cover portions 120, 142, along with an electronic flash assembly 82 and a film cartridge 20. A film winding knob or thumbwheel 30 includes an extending drive portion 103 for engaging a rotatable film spool of the film cartridge 20 as is commonly known to advance a filmstrip 21 contained therein, and a film door member 180 is releasably attached to an assembled camera 100 for retaining and accessing the film cartridge 20 which is situated within a defined chamber of the camera. Each of the above components will now be described in greater detail.

Figure 4:
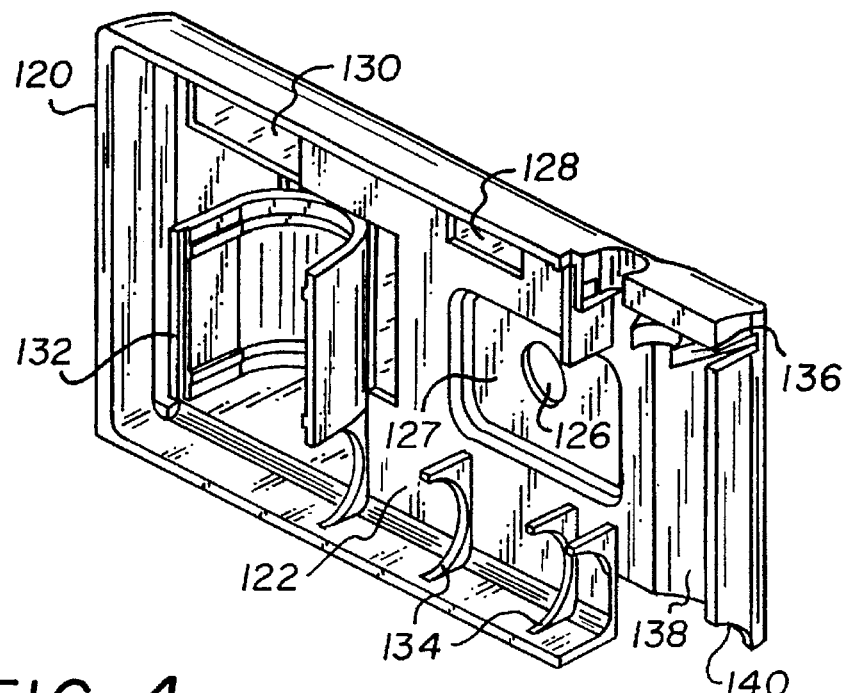
FIG. 4 is a back perspective view of the front cover portion of the camera shown in FIG. 3.

Turning now to FIGS. 3 and 4, the front cover portion 120 is made from a molded plastic and includes a inner surface 122 and an outer surface 124, best shown in FIG. 3. The front cover portion 120 also includes openings for components: a taking lens opening 126, a viewfinder opening 128, and a flash assembly opening 130. A portion 127 of the inner surface 122 immediately adjacent the taking lens opening 126 is recessed inwardly. A semi-cylindrical light shielding member or sleeve 132 extends outwardly from the inner surface 122 on one side of the taking lens opening 126 for light-tightly sealing an unexposed film roll 107, FIG. 9, as described in greater detail below. In addition, a set of curved battery retaining members 134 also extend from the inner surface 122 beneath the taking lens opening 126 and the sleeve 132 to partially define a battery compartment 110, FIG. 12, while an inwardly curved and semi-cylindrical film cartridge retaining portion 138 is provided on the other side of the taking lens opening 126 opposite the sleeve member 132 for defining a portion of a film cartridge chamber 104, FIG. 12. A cutout section 140 is provided beneath the film cartridge retaining portion 138 and adjacent the end of the battery compartment 110, FIG. 12, for accommodating the film door member 180. A thumbwheel retaining section 136 is also provided above the cartridge retaining portion 138 for positioning the thumbwheel 30 relative to the rotatable film spool of the film cartridge 20.

Figure 5:
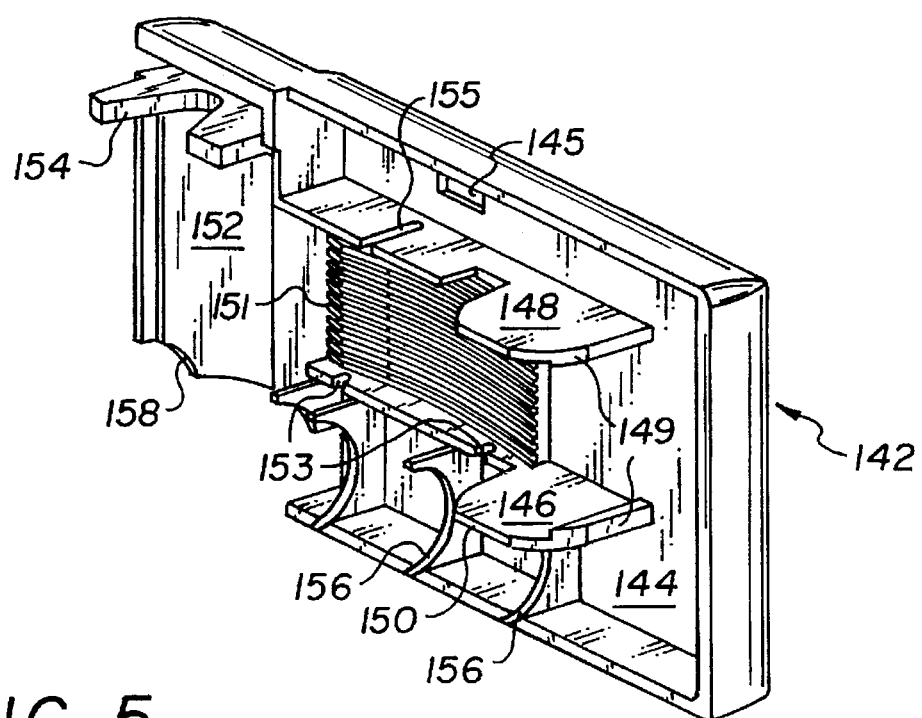
FIG. 5 is a front perspective view of the rear cover portion of the camera shown in FIG. 3.

Referring now to FIGS. 3 and 5, the rear cover portion 142 also includes an inner surface 144 and a outer surface (not shown). The inner surface 144 includes a film roll holding portion or chamber 146 on one side having a spacing defined by a pair of horizontally disposed parallel supports 148, 150 large enough to support a film roll 107, FIG. 9, as described in greater detail below. An inwardly curved semi-cylindrical film cartridge retaining portion 152 is provided on the opposite side of the cover 142 which defines a portion of the film cartridge chamber 104, FIG. 12.

Adjacent to the bottom of the rear cover portion 142 are a number of curved battery retaining members 156, which are preferably equally spaced from one another and located directly below the lower support 150 so as to define, along with the retaining members 134 of the front cover section 120, a battery compartment 110. The rear cover portion 142 also includes a cutout portion 158, similar to the cutout portion 140 of the front cover section 120, beneath the semi-cylindrical film cartridge retaining portion 152 for accommodating the film door member 180.

Figure 12:
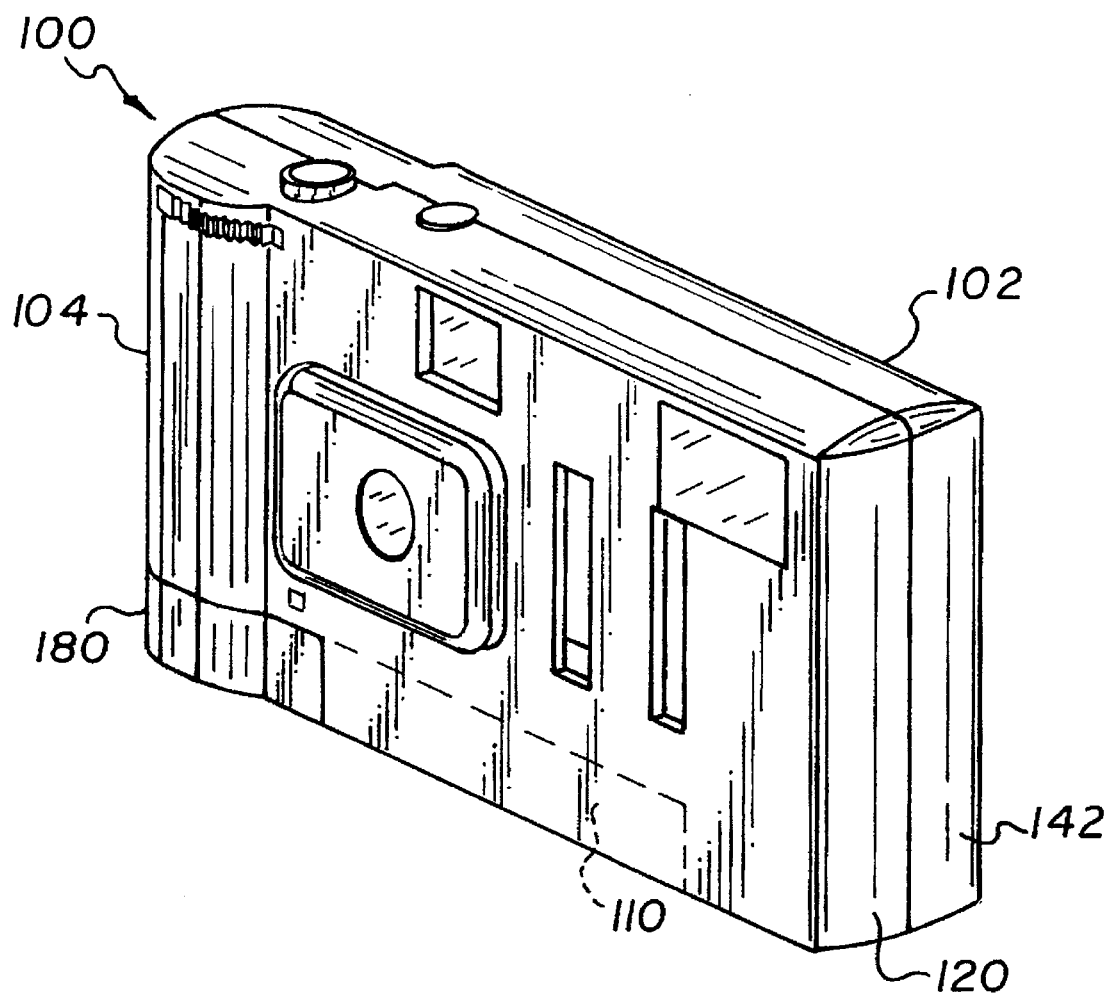
FIG. 12 is a front perspective view of an assembled camera according to the present embodiment.

When assembled together in a known manner as shown in FIG. 12, the front and rear cover portions 120, 142 define a camera body 102, having a first film chamber or film cartridge chamber 104 defined by the corresponding semi-cylindrical sections 138, 152, a second film chamber or film cartridge chamber 146 defined by supports 148 and 150 of the rear cover portion 142 which is then covered or shielded by sleeve 132 of the front cover portion 120, and a battery compartment 110 defined by the corresponding sets of retaining members 134, 156. Each of the film cartridge chamber 104 and the battery compartment 110 have respective orthogonal open ends 106, 111, FIG. 14, defined by the cutout portions 140, 158. The film door member 180, which covers each of the open ends 106, 111, FIG. 14, fits in a manner described below. The supports 148, 150 and the inward recess 127 of the front cover section 120 adjacent the taking lens opening 126 also provide spacing for positioning and accommodating the photographic module assembly 160, which will now be described in greater detail.

Figure 6:
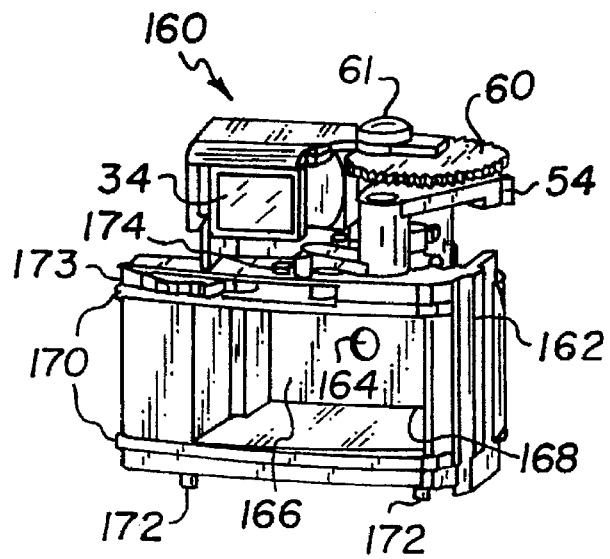
FIG. 6 is a rear perspective view of a photographic module assembly used in the camera shown in FIGS. 3–5.
Figure 7:
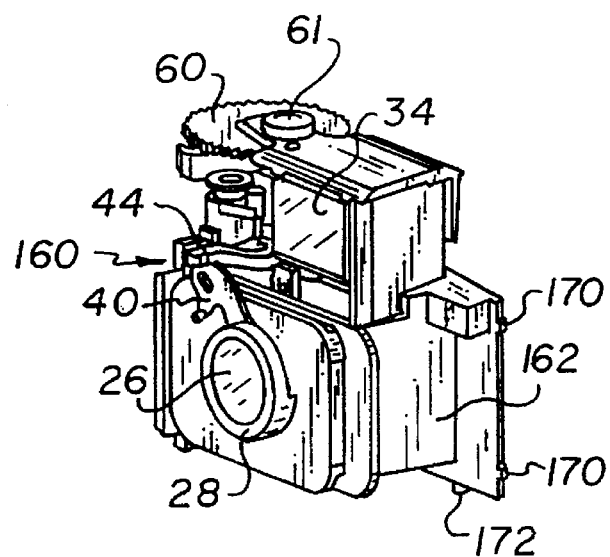
FIG. 7 is a front perspective view of the photographic module assembly shown in FIG. 6.

Referring now to FIGS. 6 and 7, the photographic module assembly 160 comprises a unitary plastic body 162 having a defined exposure chamber 166 which includes a front opening 164 and a rear opening 168. The rear opening 168 is considerably larger than the front opening 164. A pair of parallel film rails 170 border the top and bottom sides of the rear opening 168 and are spaced a distance at least equivalent to the width of the image capture area of a filmstrip 21.

Similar to the main body or frame portion 12 of the prior art camera 10, a number of photographic components are attached to the exterior of the plastic body 162 of the module assembly 160 including a taking lens 26 which is attached to the front side of the body 162 by a retainer 28 over the front opening 164. A shutter blade 40 includes a masking portion (not shown) which covers the front opening 164 and is tripped by a depressible shutter release button 36, FIG. 10, which sets into motion a high energy lever 44 in a manner commonly known to engage the shutter blade 40. A plastic viewfinder 34 is also attached to the top of the photographic module assembly 160, adjacent to the shutter release button 36, FIG. 10, as well as a rotatable frame counter 60 having a magnifier optic 61 covering a portion of the counter. The counter 60 is advanced in a known manner by a metering lever 54. An attached metering pawl 173 on the rear of the body 162 engages edge perforations (not shown) of the filmstrip 21, FIG. 10, in a manner similar to that of the sprocket 50 used in the prior art camera 10 as the filmstrip passes the defined exposure chamber 166. The above noted photographic components and their functions are commonly known in the field of photography; and therefore, their brief description is merely for completeness.

In FIGS. 8–11, a series of sequential partial assembly views of the presently described camera 100 are illustrated, though the camera itself is not assembled in this manner. That is, the described views assist in describing the positioning of the various components of the camera 100.

Figure 8:
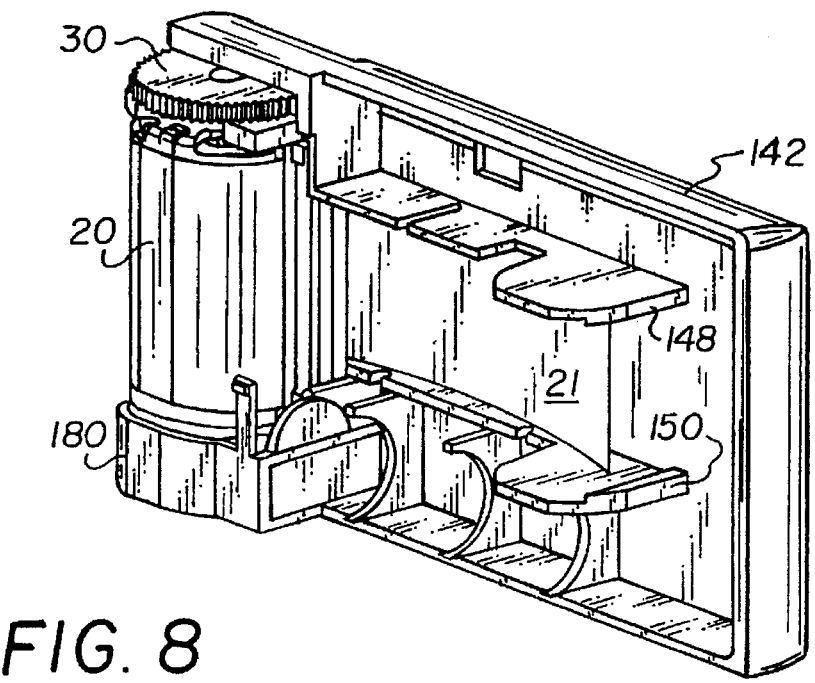
FIG. 8 is the front perspective view of the rear cover portion of FIG. 5, showing the positioning of a film cartridge in the camera.

Turning first to FIGS. 3, 5 and 8, a film cartridge 20 is shown positioned in the film cartridge retaining portion 152 of the rear cover portion 142 of the camera 100. As noted above and when fully assembled, the corresponding film cartridge retaining portions 138, 152 of the front and rear cover portions 120, 142 form the film cartridge chamber 104, FIG. 12.

The film cartridge 20, according to this particular embodiment, includes a main body section 112 having an interior rotatable film spool 118 which is capable of thrusting a leading portion of the filmstrip 21 from the confines of the cartridge as well as an active light seal or lock 116 which can be opened to open a film exit door 114 of the cartridge. Such thrusting type film cartridges are described in commonly assigned U.S. Pat. No. 5,379,538, among others. It will be readily apparent, however, that conventional 35 mm film magazines can also be used in a recyclable camera according to the present invention.

The thumbwheel 30 has an exterior portion (not shown) which extends through respective slots (not shown) in each of the front and rear cover portions 120, 142 to allow the thumbwheel to advance the filmstrip 21 in a manner commonly known from the film roll chamber 108 through the rotation of the drive member 32 with the film spool 118 of the film cartridge 20. The thumbwheel 30 is supported by the retaining portion 154. When fully assembled with the front cover portion 120, the retaining portion 134 cooperates with portion 154 to support the thumbwheel 30, each of the retaining portions having a curved receiving end for accommodating the drive portion 103.

The film door member 180 includes extending prongs 182 which engage the inner surfaces 122, 144 of the front and rear cover portions 120, 142 of the assembled camera 100 and is placed in the cutout portions 140, 158 to coincide with the shape of the camera 100. The door member 180 is slightly undersized relative to the cutout portions so that the prongs 184 are positively engaged with the inner surfaces of the front and rear cover portions. When fully assembled, FIG. 12, the door member 180 covers each of the orthogonal openings 106, 111 defined by the film cartridge chamber 104 and the battery compartment 110.

Figure 9:
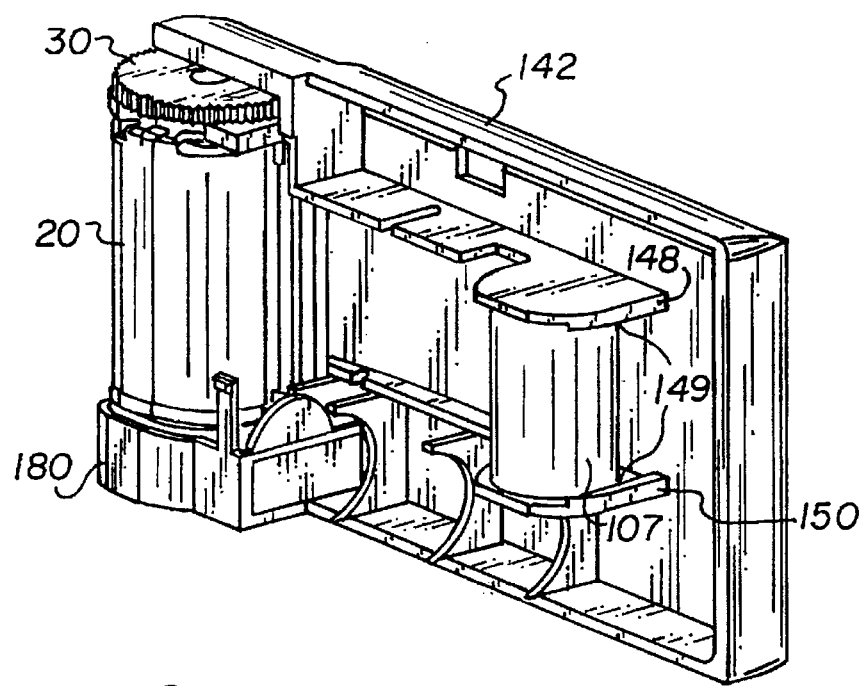
FIG. 9 is the front perspective view of FIG. 8 showing a portion of a filmstrip extending from the cartridge into the film transport path defined by the rear cover portion.

Referring now to FIG. 9, an unexposed film roll 107 is retained in the film roll holding portion 146 of the rear cover portion 142 between the top and bottom supports 148, 150, and is prevented from clockspringing by means of a pair of retaining circumferential edge surfaces 149 included on the upper and lower supports. The film roll 107 typically can be created by accessing the exterior drive portion and rotating the film spool 118 of the cartridge 20 to thrust the leading portion of the filmstrip 21 out of the cartridge 20 in any convenient manner either while the cartridge is within or exterior to the camera 100 preferably in a darkened environment. The spacing between the upper and lower supports 148, 150 is preferably adequate to prevent the unexposed film roll 107 from telescoping.

Figure 10:
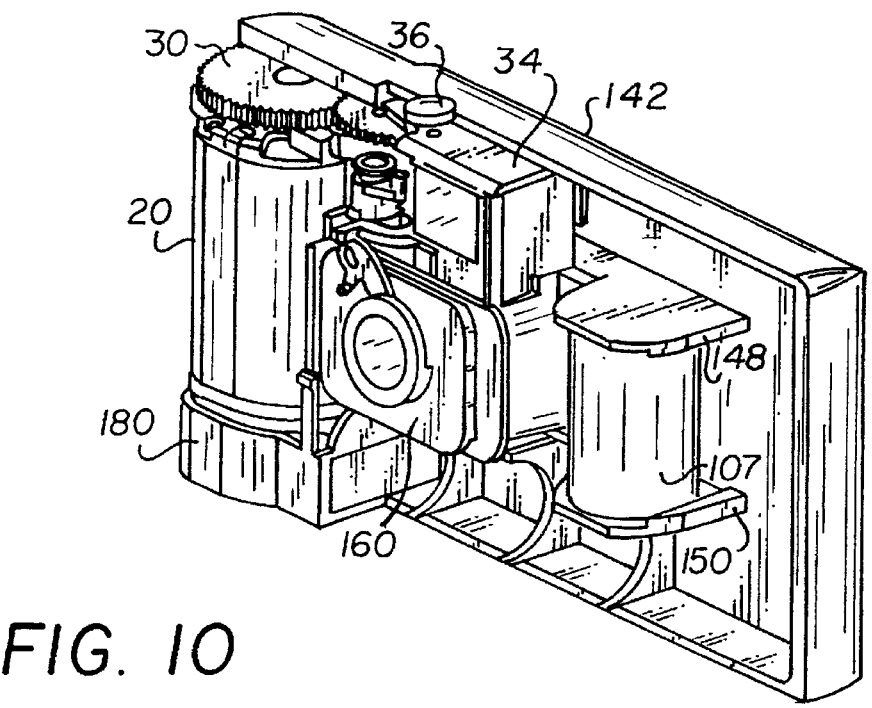
FIG. 10 is the front perspective view of FIGS. 8 and 9 showing the positioning of the photographic module assembly relative to the rear cover portion of the camera.
Figure 11:
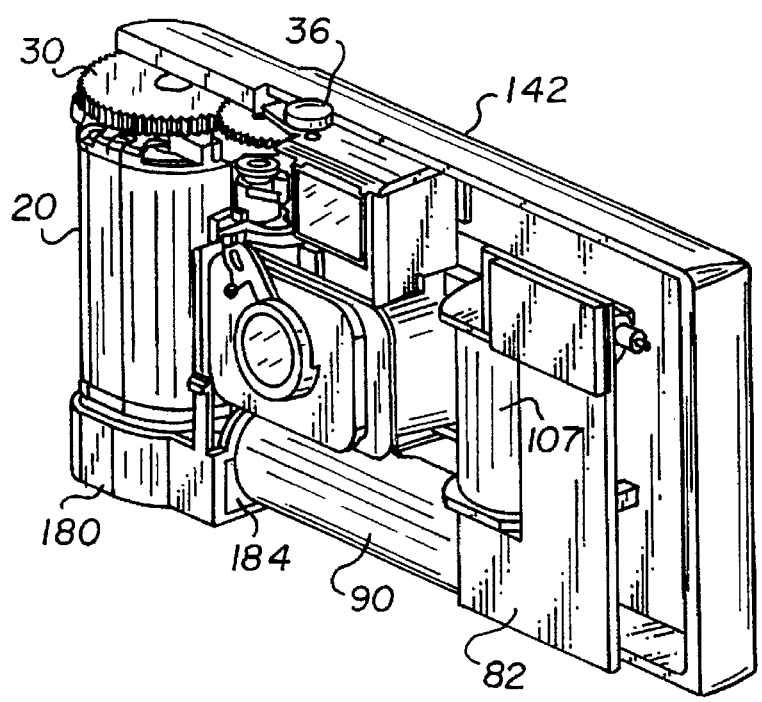
FIG. 11 is the front perspective view of the partially assembled camera of FIG. 10, with the addition of an electronic flash assembly.

FIGS. 10 and 11 illustrate the placement of a fully assembled photographic module assembly 160 within the camera 100. The photographic module assembly 160 preferably having all of the previously described components mounted thereto is aligned with the rear cover portion 142 of the camera 100 by aligning the two lower lug members 172 extending from the bottom of the body 162 with the locator slots 153 correspondingly provided in the lower support 150 and the upper pin 174 with the single locator slot 155 provided in the top support 148. This placement specifically aligns the film rails 170 with the rear platen 151 of a rear cover 142 when assembled to the camera 100, and also specifically aligns the distance between the taking lens 26 mounted to the front of the photographic module assembly with the filmstrip 21 as the front of the photographic module assembly is sized to fit within the recess 127 of the front cover section 120 when assembled thereto while the attached viewfinder 34 is aligned with the viewfinder openings 128, 145 of the front and rear cover portions 120, 142.

In addition to the positioning of the photographic module assembly, FIG. 11 also illustrates the relative positioning of the electronic flash assembly 82 within the camera 100, including the flash battery 90 in the battery compartment 110 as supported by the retaining members 156 of the rear cover portion 142.

In this particular embodiment, the flash battery 90 is shown in the location previously occupied by the capacitor of the prior art camera 10, FIGS. 1, 2. The flash capacitor of the present camera is not shown, for clarity.

As previously noted, the retaining members 134 of the front cover portion 120 and the rear cover portion 142 retain the battery 90 and also define the battery compartment 110 when the camera 100 is finally assembled. The battery compartment 110 includes an open end 111 at the cutout portions of the front and rear cover portions 120, 142 which extends through the bottom of the film cartridge chamber 104.

Figure 13:
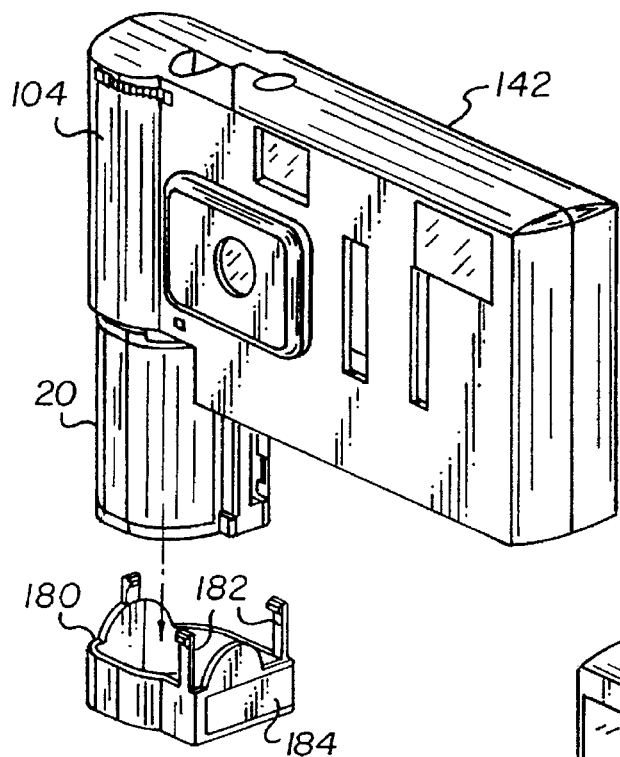
FIG. 13 is the front perspective view of the camera of FIG. 12 showing the removal of the film cartridge from the film cartridge chamber of the camera.
Figure 14:
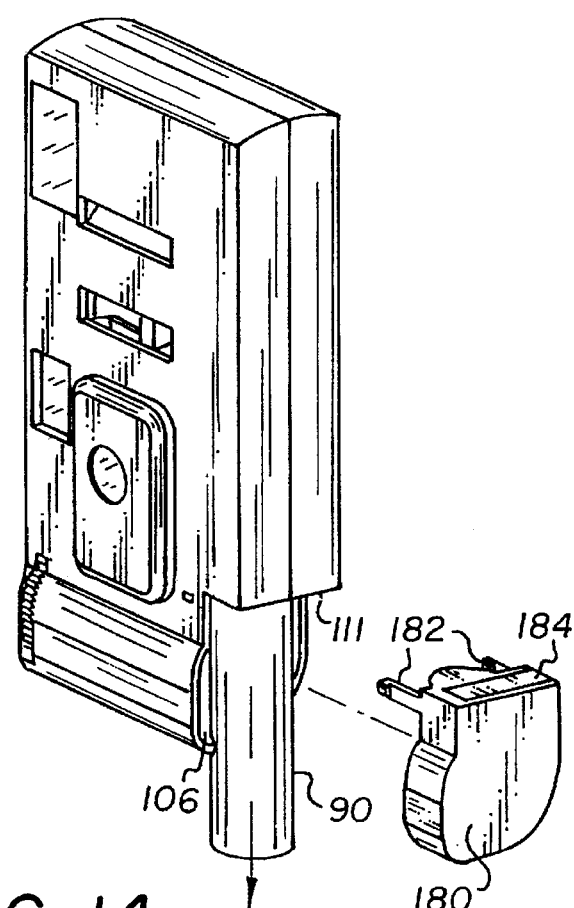
FIG. 14 is a rotated front perspective view of the camera shown in FIGS. 12 and 13, illustrating the removal of the flash battery from the camera through the film cartridge chamber.

Referring now to FIGS. 13-14, the sequential removal of the film cartridge 20 and the flash battery 90 from an assembled camera 100 of the present embodiment will now be described.

After all of the exposures have been taken by a user, the camera 100 can be taken to a photofinisher for removal of the film cartridge 20 and the flash battery 90. The camera 100 is preferably oriented in a normal position; that is, a position in which the bottom surface of the camera body 102 faces downward. The film door member 180 is removed by simultaneously applying inward pressure to the retaining prong members 182 while simultaneously pulling the door member 180 from the camera body 102, thereby separating the retaining prong members with the inner surfaces of the front and rear cover portions 120, 142, respectively. The removal of the film door portion 180 exposes the opening 106 of the film cartridge chamber 104, the film cartridge 20 being free to drop from the chamber 104 through the opening 106 for removal from the camera 100.

With the film door member 180 still removed from the camera body 102, FIG. 12, the flash battery 90 can also be removed from the battery compartment 110 by rotating the camera 100 approximately 90 degrees about the optical axis in a clockwise direction until the battery compartment 110 is oriented vertically with the opening 111 facing in a downward direction, as seen from the FIG. 14. The battery 90 can then easily slide from the confines of the battery compartment 110 through the spacing of the film cartridge chamber 104 and out of the camera body 102 through the opening 111. As opposed to the prior art camera 10, there is no separate battery door to open so that the flash battery 90 and the film cartridge 20 can be removed in a sequential operation requiring very few manipulative steps.

Although the door member 180 has convenient releasing means for allowing removal of the film cartridge 20 and the battery 90, respectively, it should be apparent that the photofinisher may still elect to crack the camera 100 open by impacting the side of the camera having the cartridge 20 in a manner previously described. This form of opening the camera, however, should be of less consequence in that the front and rear covers solely define the film cartridge chamber 104. During the recycling phase of the camera 100, the front and rear cover portions 120, 142 are typically not reused, but rather are pulverized and reground. Because the photographic module assembly 160 does not define any portion of the film cartridge chamber 104, it is less likely to be damaged by the photofinisher, and more likely to be reused along with any attached photographic component.

The camera 100 can therefore be reassembled using the original photographic module assembly 160 in the manner previously described above as attached to new front and rear cover portions 120, 142 along with the electronic flash assembly 82. After the cover portions 120, 142 have been assembled in a known manner, a fresh battery 90 can be then placed into the battery compartment 110 through the opening 111 and a film cartridge 20, such as that previously described, can then be placed into the cartridge chamber 104 through the opening 106. Finally, the film door member 180 can be attached using prong members 182, thereby covering both of the orthogonally arranged chambers 104, 110 and light-tightly sealing the camera 100. In addition, the placement of the film door member 180 initiates electrical contact by means of the conductive strip 184 which electrically contacts the end of the battery 90.

The invention has been described with reference to a preferred embodiment. However, it will be appreciated that variations and modifications can be effected by a person of ordinary skill in the art without departing from the scope of the invention.

Parts List for FIGS. 1–14

- 10 camera
- 12 main body or frame
- 14 front cover
- 16 rear cover
- 17 film cartridge chamber
- 18 film roll chamber
- 20 film cartridge
- 21 filmstrip
- 22 take-up spool
- 23 edge perforations
- 24 exposure chamber
- 26 taking lens
- 28 lens retainer
- 30 support plate
- 32 contact switch
- 34 viewfinder
- 36 shutter release button
- 38 keeper plate
- 40 shutter blade
- 42 spring
- 44 high-energy lever
- 46 helical spring
- 48 film winding knob
- 50 sprocket
- 52 cam
- 54 metering lever
- 56 spring
- 58 extending portion
- 60 frame counter
- 80 light baffle
- 82 electronic flash assembly
- 84 circuit board
- 86 capacitor
- 88 flash head
- 90 battery
- 92 label
- 94 first break-away door
- 96 second break-away door
- 97 battery compartment
- 98 engagement snaps
- 99 holes
- 100 camera
- 102 camera body
- 103 drive portion
- 104 cartridge chamber
- 106 opening
- 107 film roll
- 108 film roll chamber
- 110 battery compartment
- 111 opening
- 112 body
- 114 film exit door
- 116 light lock
- 118 rotatable film spool
- 120 front cover portion
- 122 inner surface
- 124 outer surface
- 126 taking lens opening
- 127 recessed portion
- 128 viewfinder opening
- 130 flash reflector opening
- 132 light sleeve
- 134 battery retaining members
- 136 thumbwheel retaining portion
- 140 cutout portion
- 142 rear cover portion
- 144 inner surface
- 145 opening
- 146 film roll holding portion
- 148 top support
- 149 film retaining edges
- 150 bottom support
- 151 rear platen
- 152 film cartridge retaining portion
- 154 thumbwheel locating portion
- 156 battery retaining members
- 158 cutout portion
- 160 photographic module assembly
- 162 body
- 164 front opening
- 166 exposure chamber
- 168 rear opening
- 170 film rails
- 172 lugs
- 174 pin
- 180 film door member
- 182 prongs
- 184 battery terminal

I claim:

1. A camera comprising: a front cover, a rear cover attached to said front cover, and a photographic module assembly sandwiched between said front and rear covers, said photographic module assembly including a taking lens, said camera having means for defining a film cartridge chamber, a film roll chamber and an exposure chamber between said film cartridge chamber and said film roll chamber, said photographic module assembly having means for defining only one of said chambers, and said front and rear covers including means for defining the other two chambers.

2. A camera as recited in claim 1, wherein said photographic module assembly includes means for defining an exposure chamber.

3. A camera as recited by claim 1, wherein said photographic module assembly includes attachment means for releasably attaching to said rear cover.

4. A camera comprising a front cover, a rear cover attached to said front cover, and a photographic module assembly sandwiched between said front and rear covers, said camera having means for defining a film cartridge chamber, a film roll chamber and an exposure chamber between said film cartridge chamber and said film roll chamber, is characterized in that:

said photographic module assembly has means for defining only one of said front and rear covers include means for defining the other two chambers, said photographic module assembly includes attachment means for releasably attaching to said rear cover, and said module assembly includes a plurality of locator pins for specifically locating said module assembly a predetermined distance from said rear cover.

5. A camera comprising a front cover, a rear cover attached to said front cover, and a photographic module assembly sandwiched between said front and rear covers, said camera having means for defining a film cartridge chamber, a film roll chamber and an exposure chamber between said film cartridge chamber and said film roll chamber, is characterized in that:

said photographic module assembly has means for defining only one of said chambers, said front and rear covers include means for defining the other two chambers, and said photographic module assembly comprises a pair of parallel film rails bordering said exposure chamber for supporting a filmstrip between said film cartridge chamber and said film supply chamber.

6. A camera as recited in claim 2, wherein said module includes locator means for specifically locating said module assembly relative to said front and rear cover portions.

7. A camera comprising a front cover, a rear cover attached to said front cover, and a photographic module assembly sandwiched between said front and rear covers, said camera having means for defining a film cartridge chamber, a film roll chamber and an exposure chamber between said film cartridge chamber and said film roll chamber, is characterized in that:

said photographic module assembly has means for defining only one of said chambers, and said front and rear covers include means for defining the other two chambers, said photographic module assembly includes means for defining an exposure chamber, said module includes locator means for specifically locating said module assembly relative to said front and rear covers, and said photographic module assembly includes a plurality of guide pins for engaging slots provided in said rear cover.

8. A camera comprising:

a body having a front cover and a rear cover, said covers being joined together, said front cover having a taking lens opening;

a photographic module assembly disposed within said body between said front and rear covers, said photographic module assembly defining an exposure chamber having opposed front and rear openings, said front opening being situated between said taking lens opening and said rear opening;

said front and rear covers having means for defining first and second film chambers, said exposure chamber being disposed between said film chambers.

9. The camera of claim 8 further comprising a taking lens disposed between said taking lens opening and said front opening.

10. The camera of claim 8 wherein at least one of said film chambers is configured to receive a film cartridge.

11. The camera of claim 8 wherein said photographic module assembly includes a pair of parallel film rails bordering said exposure chamber for supporting a filmstrip between said film chambers.

12. The camera of claim 11 wherein said photographic module assembly includes locator means for specifically locating said module relative to said front and rear cover portions.

13. The camera of claim 8 wherein said photographic module assembly includes locator means for specifically locating said module relative to said front and rear cover portions.

14. The camera of claim 8 wherein said photographic module assembly includes locator means for specifically locating said module assembly a predetermined distance from said rear cover.

15. The camera of claim 8 wherein said photographic module assembly includes locator a plurality of guide pins for engaging slots in at least one of said covers.

16. A camera comprising: a front cover; a rear cover joined to said front cover; said front and rear covers defining first and second film chambers; a photographic module assembly disposed between said front and rear covers, said photographic module assembly defining an exposure chamber disposed between said film chambers, said photographic module assembly including a pair of parallel film rails bordering said exposure chamber for supporting a filmstrip between said film chambers.

17. The camera of claim 8 wherein at least one of said film chambers is configured to receive a film cartridge.

18. The camera of claim 8 wherein said photographic module assembly includes locator means for specifically locating said module relative to said front and rear cover portions.

19. The camera of claim 8 wherein said photographic module assembly includes locator means for specifically locating said module assembly a predetermined distance from said rear cover.

20. The camera of claim 8 wherein said photographic module assembly includes locator a plurality of guide pins for engaging slots in at least one of said covers.

* * * * *